UNITED STATES PATENT OFFICE.

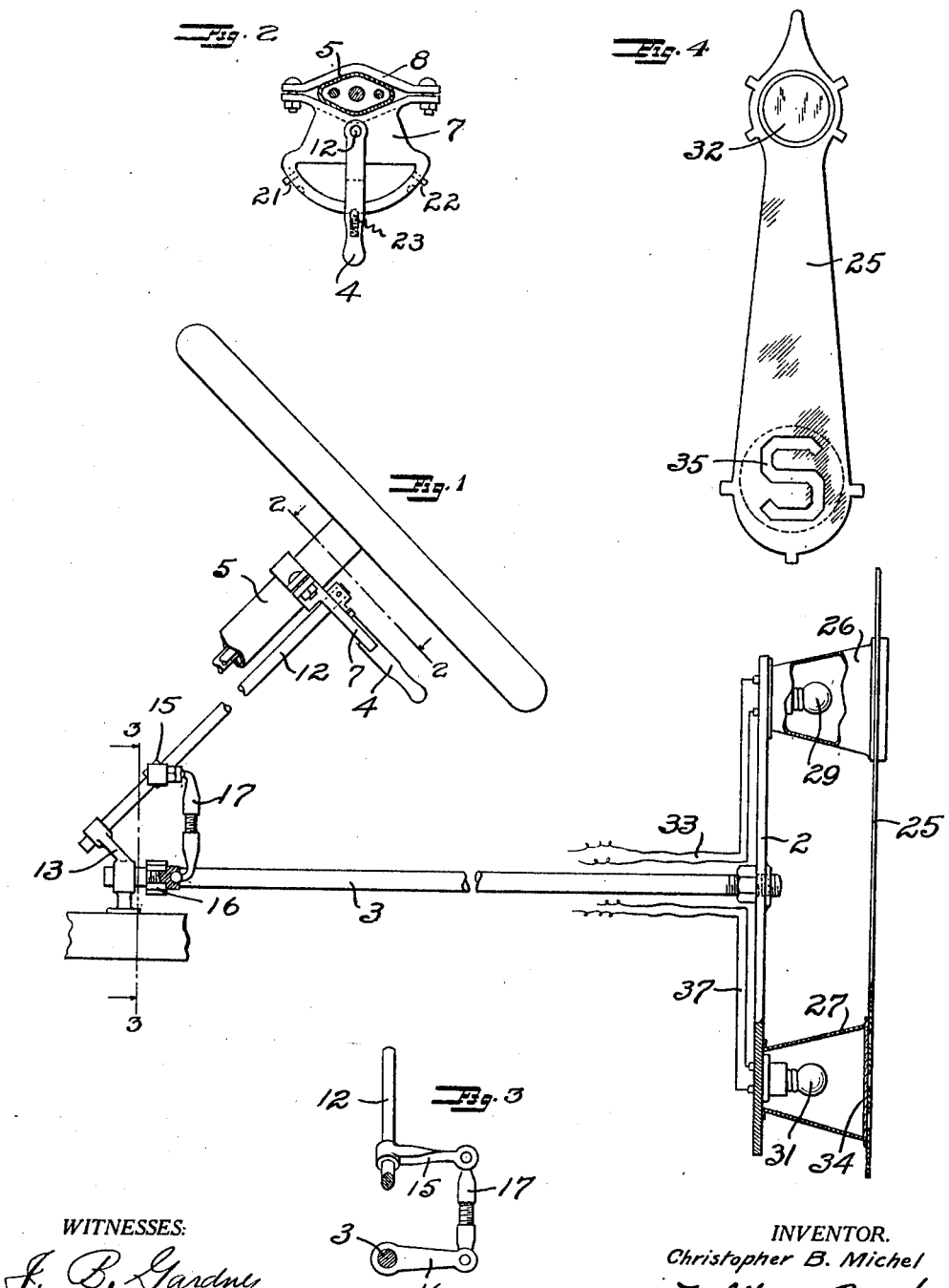

CHRISTOPHER B. MICHEL, OF OAKLAND, CALIFORNIA.

AUTOMOBILE-SIGNAL.

1,270,857.  Specification of Letters Patent.  Patented July 2, 1918.

Application filed September 6, 1916. Serial No. 118,615.

*To all whom it may concern:*

Be it known that I, CHRISTOPHER B. MICHEL, a citizen of the United States, and a resident of Oakland, county of Alameda, State of California, have invented a new and useful Automobile-Signal, of which the following is a specification.

My invention relates to signaling devices and especially signaling devices for automobiles.

An object of my invention is to provide a direction signal on an automobile to indicate to those behind in what direction the automobile is to turn.

Another object of my invention is to provide an improved automobile tail light.

Another object of my invention is to provide a device of the class described comprising a direction signal and a stop signal.

The invention possesses other features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to the drawings:

Figure 1 is a side elevation of the signal applied to an automobile. Portions of the figure are broken away to reduce the size.

Fig. 2 is a section through the steering post of the automobile taken on the line 2—2 of Fig. 1, and showing the signal operating lever.

Fig. 3 is a section on the line 3—3 of Fig. 1 showing a portion of the signal operating mechanism.

Fig. 4 is an elevation of the signal arm.

A large number of automobile accidents are due to the fact that the intentions of a driver relative to turning and stopping are not clear to the driver of a following car. In the present invention I provide a signal which is controlled by the driver and by means of which the driver of any car in the rear is informed whether the first driver intends to stop or turn to the left or to the right.

A frame 2 is mounted upon a shaft 3 which is arranged in suitable bearings on the frame or body of the car so that it may be partially revolved or oscillated to vibrate the frame 2 through a suitable arc which I prefer to make about 90° on each side of the vertical or normal position of the frame 2. Means are provided for oscillating the shaft 3, including a lever 4 arranged in a convenient place on the steering column 5 of the car so that it is easily reached by the driver. A plate 7 is secured to the steering post by the clamp member 8 and a shaft 12 to which the operating lever 4 is secured, is journaled in the plate and in a bearing of the stand 13 arranged conveniently on the floor or other suitable portion of the car. Preferably one end of the shaft 3 is also journaled in the stand 13. Lever arms 15 and 16 are secured to the shafts 12 and 3 respectively, the ends of the lever arms being provided with sockets in which the ball ends of the link 17 are articulated.

It is thus clear that movement of the operating lever 4 through the mediate connections comprising the shaft 12, the link 17 and the shaft 3, operates to move the frame 2 to one side or the other of the vertical position. Stops 21 and 22 are provided on the plate 7 to limit the throw of the lever 4 and a spring-pressed catch 23 adapted to engage suitably located sockets in the curved rim of the plate serves to hold the lever 4 in the position in which it is set.

Attached to the frame 2 is a signal arm 25 which moves with the frame and which is visible to any one viewing the car from the rear. The signal arm 25 is attached to the frame by means of conically formed members 26 and 27 in the bases of which are arranged the lights 29 and 31. The cones thus act as reflectors and protective casings for the lights. The signal arm is preferably formed like an arrow with the head end adjacent the cone 26, which is provided with a red glass or lens 32. The light 29 in this cone is connected through the circuit 33 with the lighting system of the car and at night becomes the tail light, taking the place of the usual tail light. It is intended that this light shall burn constantly during the night use of the car.

During the day, the signal arm is turned to point to the right or left of its normally upright position, by means of the operating lever 4, to indicate to the car following in which direction the driver intends to turn, and at night the red tail light upon the arm similarly shifted conveys the same information about the impending turn.

The lower cone 27 is provided with a preferably red glass 34, and a letter "S", 35, to indicate "stop" is cut in the material of the signal arm over the glass. The light 31 is controlled through the circuit 37 by a push button arranged convenient to the driver who is thus able at will to cause a brilliant red S to flash from the signal arm as a stop signal to those following.

I claim:

1. An automobile signal comprising a shaft, a direction-indicating signal arm attached to said shaft, means for oscillating said shaft to move said signal arm, a tail light for said automobile arranged in the head of said signal arm, an independently illuminable stop signal arranged on said arm, and conical casings protecting and forming reflectors for said tail light and said stop signal light.

2. An automobile signal comprising a shaft, a frame secured to said shaft and adapted to move when said shaft is rotated, a conical reflector casing arranged at each end of said frame, a tail light arranged in one of said casings, an independently illuminable signal light in the other casing, an arm for indicating direction lying across and supported by said reflector casings and having apertures therein above said lights, and means for turning said shaft to move said frame and signal arm.

In testimony whereof, I have hereunto set my hand at Oakland, California, this first day of September, 1916.

CHRISTOPHER B. MICHEL.

In presence of—
C. W. NOBEL,
W. R. BROOKES.

Copies of this patent may be obtained for five cents each, by addressing the "Commissioner of Patents, Washington, D. C."